(12) United States Patent
Chang et al.

(10) Patent No.: US 7,046,453 B1
(45) Date of Patent: May 16, 2006

(54) STEPWISE VARIABLE ZOOM LENS SYSTEM

(75) Inventors: Kuo Wen Chang, Chung Ho (TW); Ming-Sen Tsao, Chung Ho (TW)

(73) Assignee: Nucam Corporation, Taipei (TW)

( * ) Notice: Subject to any disclaimer, the term of this patent is extended or adjusted under 35 U.S.C. 154(b) by 0 days.

(21) Appl. No.: 11/072,284

(22) Filed: Mar. 7, 2005

(51) Int. Cl.
*G02B 15/14* (2006.01)

(52) U.S. Cl. .................. 359/689; 359/680; 359/686

(58) Field of Classification Search ........... 359/676, 359/680, 686, 689
See application file for complete search history.

(56) References Cited

U.S. PATENT DOCUMENTS

2004/0263995 A1* 12/2004 Adachi ................ 359/684

* cited by examiner

*Primary Examiner*—Scott J. Sugarman
*Assistant Examiner*—Darryl J. Collins

(74) *Attorney, Agent, or Firm*—Rosenberg, Klein & Lee

(57) ABSTRACT

A stepwise variable zoom lens system according to the present invention has, in order from an object side, a first lens group of negative refracting power, a second lens group of positive refracting power, and a third lens group of positive refracting power. The first and third lens groups are constructed from a single block. The second lens group includes a positive first lens unit and a negative second lens unit which is also constructed from a single block. The first and third lens groups are fixed, and the second lens group is movable to be selectively disposed in several discrete positions. The focal lengths of the lens groups satisfy the following relations:

$$f_2 \cdot (1 + \sqrt{z}) > -f_1$$

$$f_2 \cdot \left(1 + \frac{1}{\sqrt{z}}\right) > \frac{f_3 \cdot f_b}{f_3 - f_b}$$

wherein $f_1$, $f_2$ and $f_3$ denote the focal lengths of the first, second and third lens groups respectively, $f_b$ denotes the back focal length of the stepwise variable zoom lens system, and z denotes the zoom ratio.

9 Claims, 15 Drawing Sheets

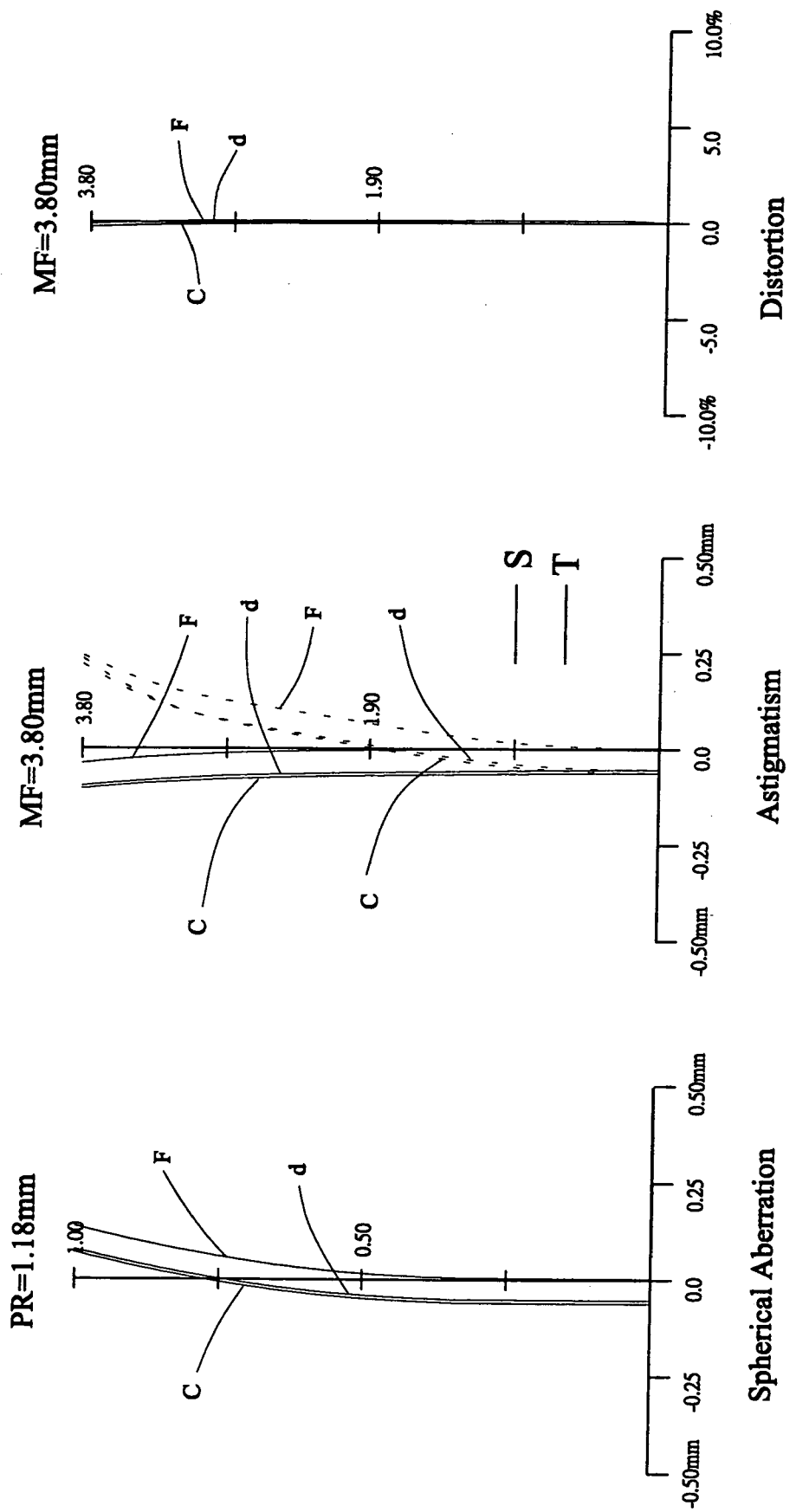

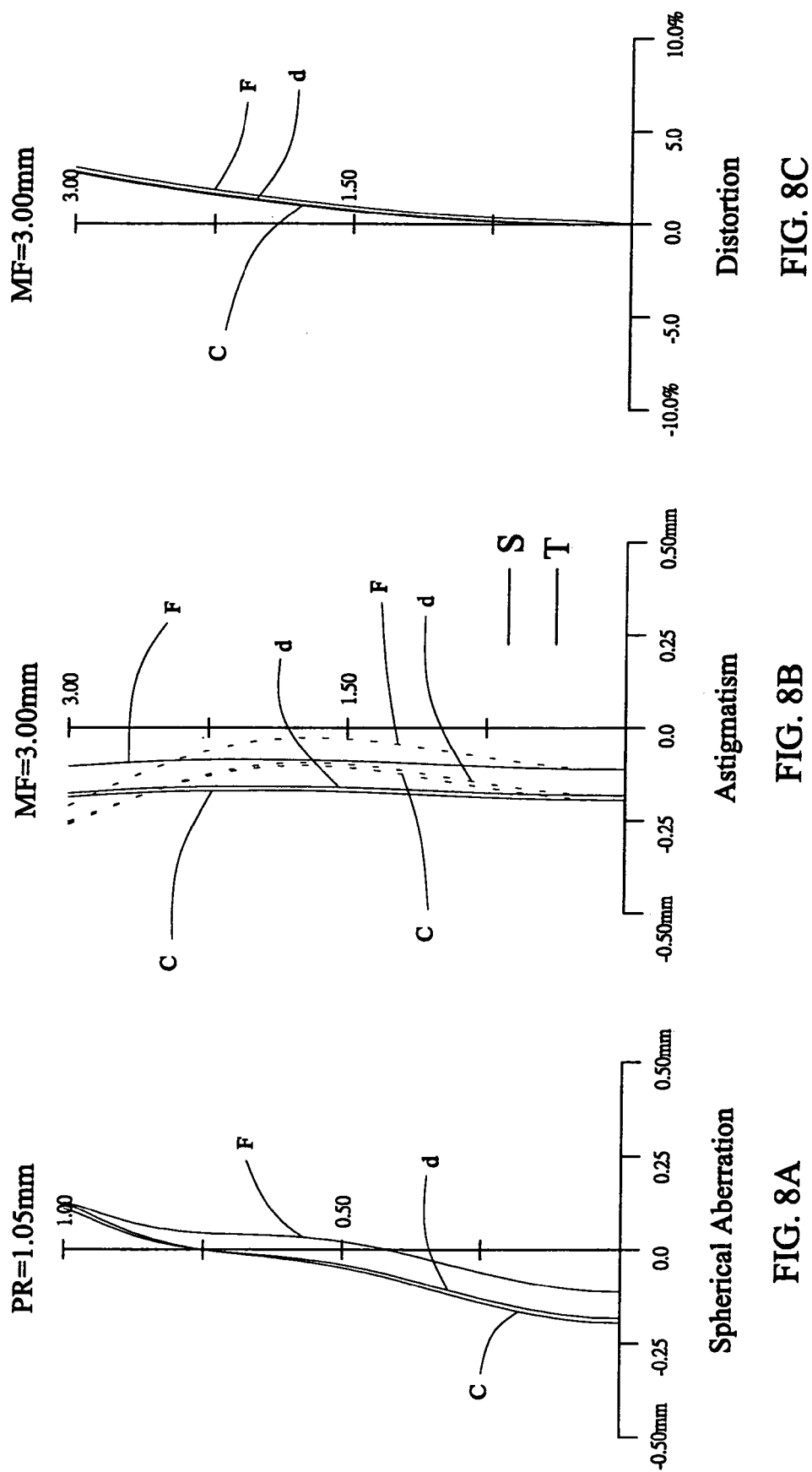

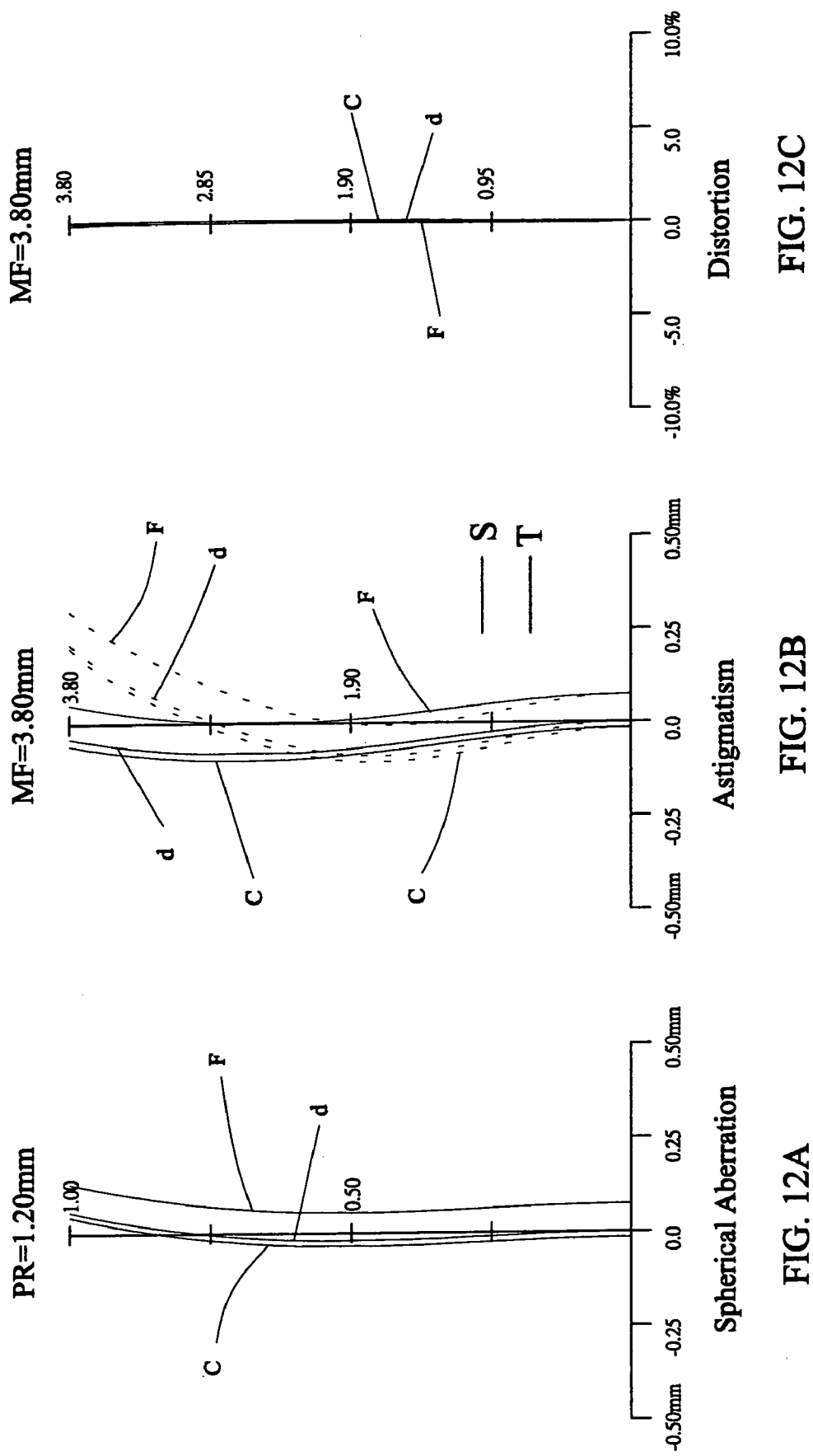

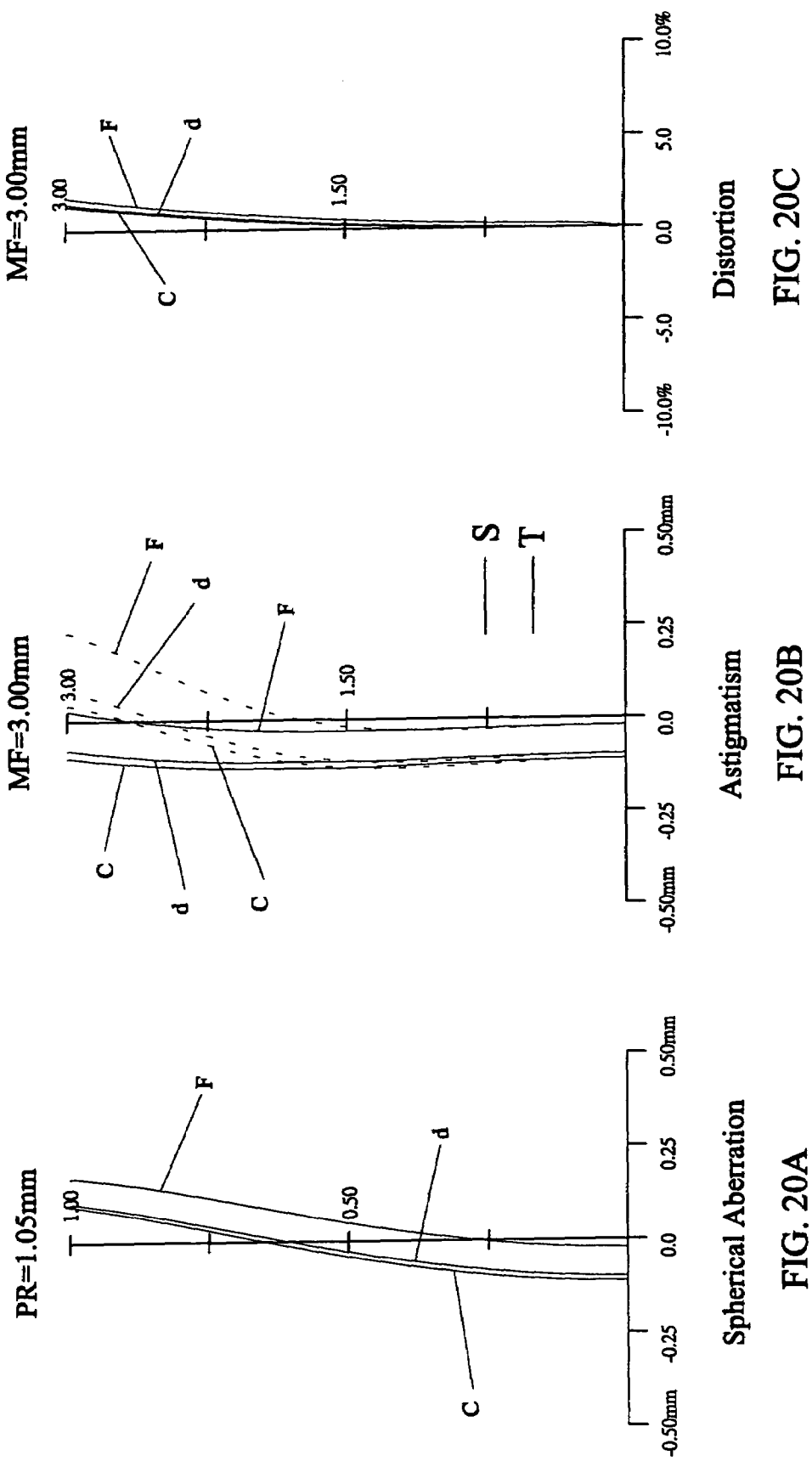
FIG. 20A  Spherical Aberration
FIG. 20B  Astigmatism
FIG. 20C  Distortion

STEPWISE VARIABLE ZOOM LENS SYSTEM

FIELD OF THE INVENTION

The present invention generally relates to a zoom lens system, more particularly to a stepwise variable zoom lens system which has a short overall length and is suitable for compact electronic equipments.

THE RELATED ART

In recent years, compact electronic equipments with photographic function, such as simple cameras, mobile phones and PDAs, have been more and more popular. These compact electronic equipments have become so small that they require zoom lens systems to be configured therein be as short as possible in overall length and as simple as possible in structure.

U.S. Pat. No. 5,357,374 issued on Oct. 18, 1994 discloses a zoom lens system which has a first lens group having a negative refractive power, a second lens group having a positive refractive power and a third lens group having a negative refractive power, wherein each lens group is composed of one lens. Although the structure of the zoom lens system is simplified, electronic equipments which utilize this type of zoom lens system can not create a satisfying image. Furthermore, with the arrangement of the three lens groups, the overall length of zoom lens system is not reduced enough for more and more thin electronic equipments. U.S. Pat. No. 6,545,824 issued on Apr. 8, 2003 discloses another lens system which has a first lens group having a negative refractive power, a second lens group having a positive refractive power and a third lens group having a positive refractive power. Because each lens group includes a plurality of lens, it is detrimental to decrease the overall length and simplify the structure of the lens system. Although the first and the third lens groups are fixed, the second lens group is movable to focus without zooming. With this arrangement, the lens system is incapable of varying the field of view of vision during taking a picture.

SUMMARY OF THE INVENTION

An object of the present invention is to provide a stepwise zoom lens system which has a short overall length, a simple and compact structure.

To achieve the above object, the present invention provides a stepwise variable zoom lens system for creating an image of a scene on an image sensor, which includes, in order from an object side, a first lens group having a negative refracting power, a second lens group having a positive refracting power, and a third lens group having a positive refracting power. The first and the third lens groups are constructed from a single block. The second lens group includes a first lens unit having a positive refracting power and a second lens unit having a negative refracting power. The second lens unit is also constructed from a single block. The first and third lens groups are fixed relatively to the image sensor, and the second lens group is movable so as to be selectively disposed in several discrete positions. The focal lengths of the lens groups satisfy the following relations:

$$f_2 \cdot (1 + \sqrt{z}) > -f_1$$

$$f_2 \cdot \left(1 + \frac{1}{\sqrt{z}}\right) > \frac{f_3 \cdot f_b}{f_3 - f_b}$$

wherein $f_1$ denotes the focal length of the first lens group, $f_2$ denotes the focal length of the second lens group, $f_3$ denotes the focal length of the third lens group, $f_b$ denotes the back focal length of the stepwise variable zoom lens system, and z denotes the zoom ratio.

According to the mentioned above, the first lens group and the third lens group are composed of a single block, and the second lens group are composed of a positive first lens unit and a negative second lens unit; and in the zooming process, the first and the third lens groups are fixed relatively to the image sensor, and the second lens group is movable so as to be selectively disposed in several discrete positions, therefore, the stepwise variable zoom lens system has a short overall length, a simple and compact structure.

BRIEF DESCRIPTION OF THE DRAWINGS

The present invention will be apparent to those skilled in the art by reading the following description of embodiments thereof, with reference to the attached drawings, in which:

FIGS. 4A–4C show spherical aberration, astigmatism, and distortion, respectively, of the stepwise variable zoom lens system in the second position according to the first embodiment;

FIGS. 8A–8C show spherical aberration, astigmatism, and distortion, respectively, of the stepwise variable zoom lens system in the second position according to the second embodiment;

FIGS. 12A–12C show spherical aberration, astigmatism, and distortion, respectively, of the stepwise variable zoom lens system in the second position according to the third embodiment;

FIGS. 20A–20C show spherical aberration, astigmatism, and distortion, respectively, of the stepwise variable zoom lens system in the second position according to the fifth embodiment.

DETAILED DESCRIPTION OF THE PREFERRED EMBODIMENTS

Figure 1:
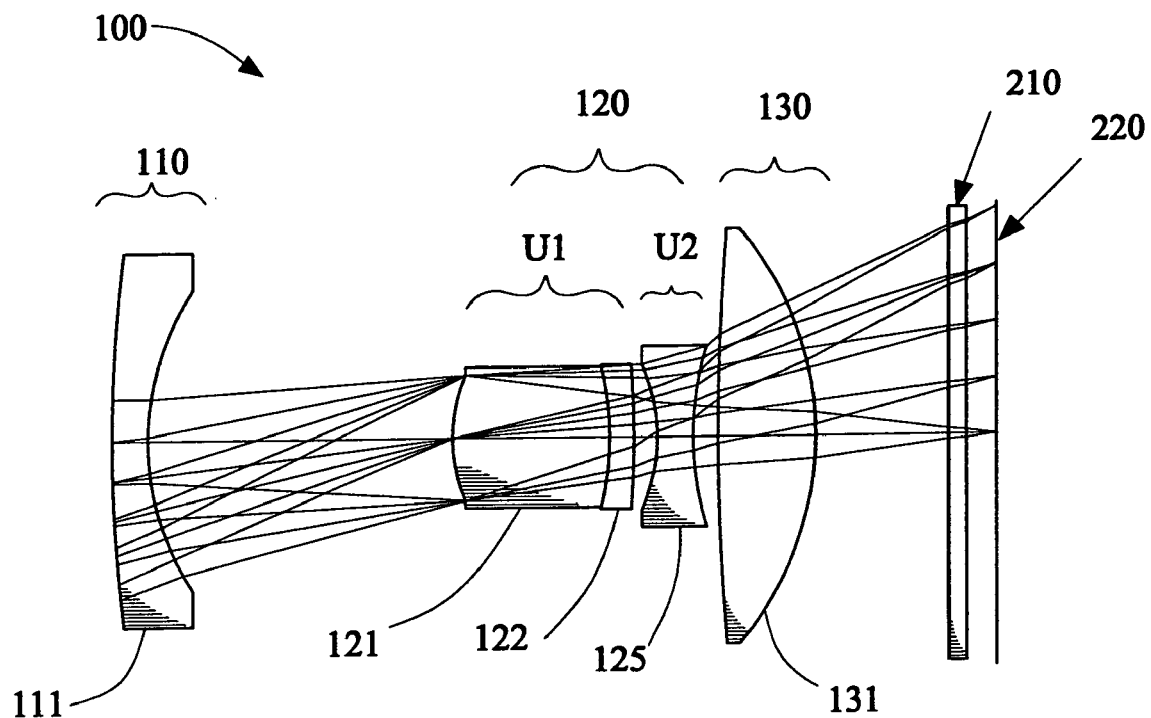
FIG. 1 is a cross-sectional view of a stepwise variable zoom lens system in a first position of a first embodiment according to the present invention.
Figure 2:
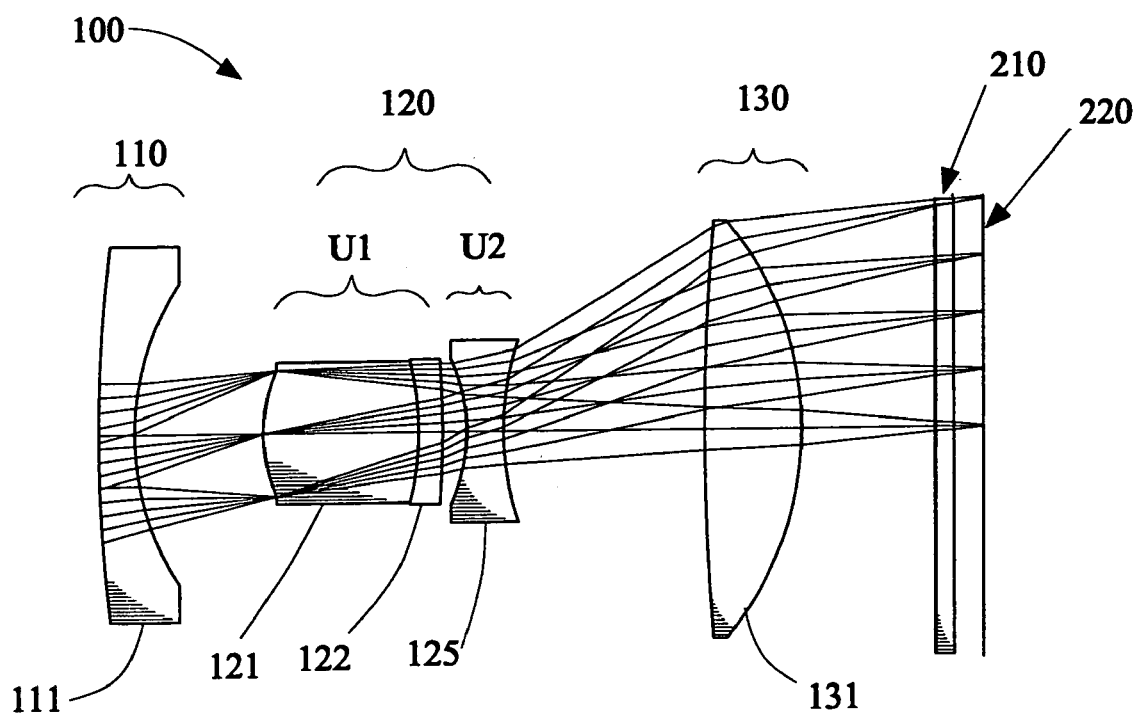
FIG. 2 is a cross-sectional view of the stepwise variable zoom lens system in a second position of the first embodiment.
Figures 3A, 3B, 3C:
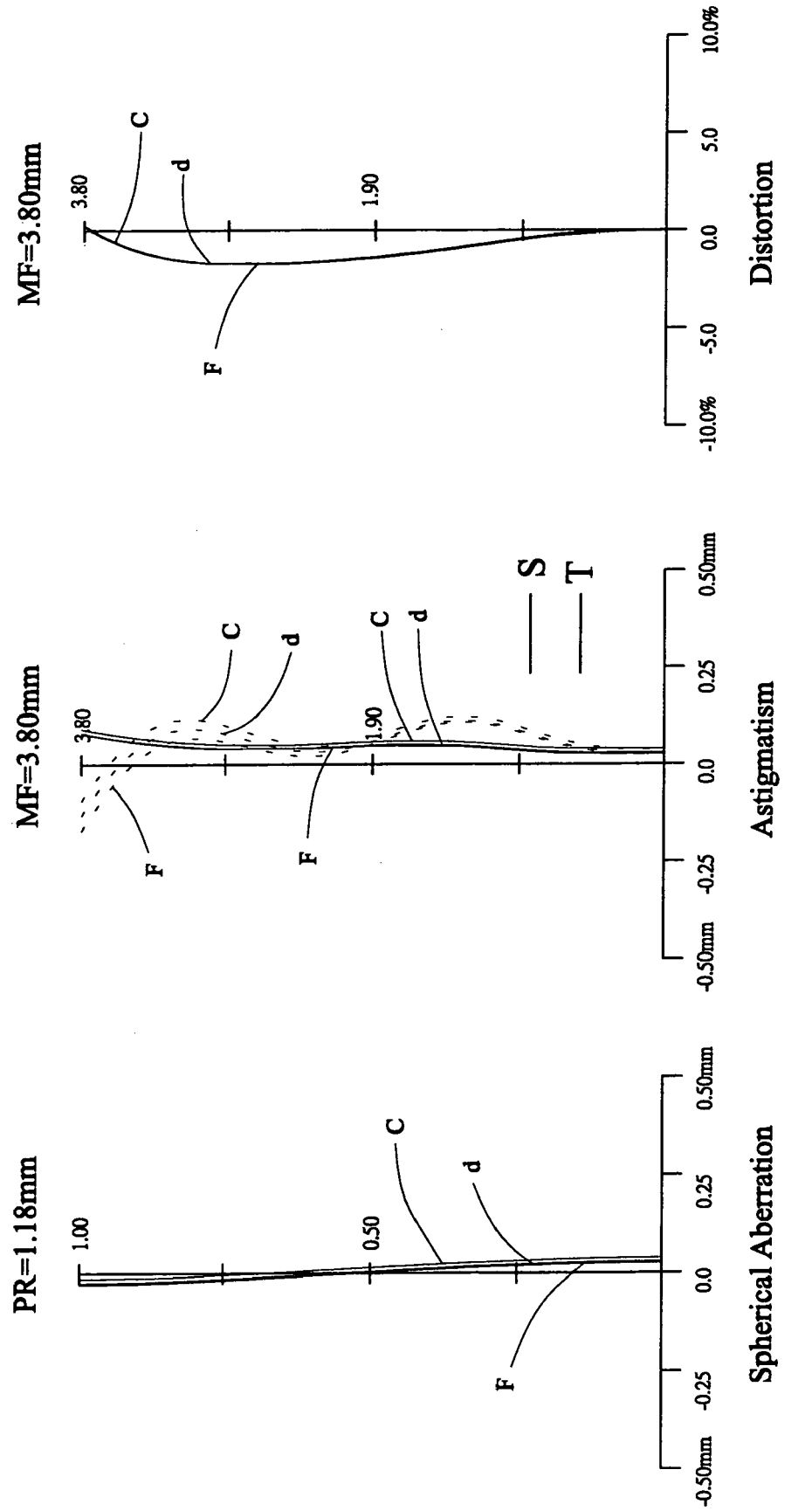
FIGS. 3A–3C show spherical aberration, astigmatism, and distortion, respectively, of the stepwise variable zoom lens system in the first position according to the first embodiment.

With reference to FIG. 1 and FIG. 2, a first embodiment of a stepwise variable zoom lens system 100 according to the present invention is shown. Light of a scene is focused on an image sensor 220 after passing through the stepwise variable zoom lens system 100 and a cover glass 210. The stepwise variable zoom lens system 100, in order from an object side, includes a first lens group 110 having a negative refracting power, a second lens group 120 having a positive refracting power and a third lens group 130 having a positive refracting power. Focal lengths of the three lens groups are preferable to satisfy the following relation:

$$f_2 \cdot (1+\sqrt{z}) > -f_1 \qquad (1)$$

$$f_2 \cdot \left(1 + \frac{1}{\sqrt{z}}\right) > \frac{f_3 \cdot f_b}{f_3 - f_b} \qquad (2)$$

Wherein $f_1$ denotes the focal length of the first lens group 110, $f_2$ denotes the focal length of the second lens group 120, $f_3$ denotes the focal length of the third lens group, $f_b$ denotes the back focal length of the stepwise variable zoom lens system 100, and z denotes the zoom ratio.

The first lens group 110 is constructed from a single block. The term "single block" is defined as (a) a single lens element or (b) a cemented lens composed of several lenses elements cemented together or (c) a hybrid lens composed of a glass lens element and a thin resin lens element pressed together. In the first embodiment, the first lens group 110 is composed of a convex-concave negative lens 111. In order to decrease chromatic aberrations, Abbe number of the convex-concave negative lens 111 is preferable to be bigger than 50. Besides, both refractive surfaces of the convex-concave negative lens 111 are aspheric for reducing the aberration further. Each aspheric surface satisfies the following equation:

$$X = \frac{cS^2}{1+\sqrt{1-(K+1)c^2S^2}} + A_4S^4 + A_6S^6 + A_8S^8 + A_{10}S^{10} + A_{12}S^{12} \qquad (3)$$

Wherein c designates a curvature of the aspheric vertex, S designates a distance from the optical axis; K designates the conic coefficient, $A_4$, $A_6$, $A_8$, $A_{10}$ and $A_{12}$ designate the fourth, sixth, eighth, tenth, and twelfth aspheric coefficients, and X designates the sag of a line drawn from a point on the aspheric lens surface at a distance S from the optical axis to the tangential plane of the aspheric surface vertex.

The second lens group 120 is composed of a first lens unit U1 having a positive refracting power and the second lens unit U2 having negative refracting power. The first lens unit U1 includes at least one single block. The second lens unit U2 is constructed from a single block. In the first embodiment, the first lens unit U1 is composed of a cemented positive lens that is cemented by a biconvex positive lens 121 and a concave-convex negative lens 122. The second lens unit U2 is composed of a biconcave negative lens 125 which is used to decrease the chromatic aberration and the aberration. In order to decrease the aberration, both refractive surfaces of the biconcave negative lens 125 are also aspheric, and each aspheric surface satisfies the equation (3).

The third lens group 130 is constructed from a single block. The single block is composed of a biconvex positive lens 131 which can compensate the aberration of the first lens group 110 and improve the field curvature to make the image sensor 220 receive the light passing through the stepwise variable zoom lens system 100 easily. The refractive surface facing to the object side of the biconvex positive lens 131 has a smaller curvature for infrared cut off coating being applied thereon. Therefore it is not necessary to use an additional infrared cut off filter. The space reserved for the infrared cut off filter can be eliminated. The overall length of the lens can be reduced.

The stepwise variable zoom lens system 100 further includes an aperture (not shown in figures) which is attached at surface facing to the object side of the biconvex positive lens 121. Therefore there is not relative motion between the aperture and the second lens group 120.

With reference to FIG. 1 and FIG. 2 again, the zooming process of the stepwise variable zoom lens system 100 is shown in the following.

In the present invention, the first lens group 110 and the third lens group 130 do not move relatively to the image sensor 220, and the second lens group 120 is moved forward and back to vary focal length. In order to create an image on the image sensor 220 without a focusing compensated lens group, the second lens group 120 is only selectively disposed on a first position and a second position. By moving the second lens group 120 from one position to the other, the focal length of the stepwise variable zoom lens system 100 is changed, and at the same time, the focusing process is achieved. This zoom mode that only choose several discrete zoom positions to zoom stepwise is different from the continuously zoom mode which needs an additional focusing compensated lens group. In the present embodiment, the first position shows the wide-angle end, as shown in FIG. 1, and the second position shows the telephoto end, as shown in FIG. 2.

Table 1 below lists the surface number, in order from the object side, the radius of curvature R (in mm) of each optical surface at the optical axis, the distance $d_1$ (in mm) between vertexes of adjacent optical surfaces when the second lens group 120 is disposed in the first position, the distance $d_2$ (in mm) between vertexes of adjacent optical surfaces when the second lens group 120 is disposed in the second position, the Abbe number V, and the refractive index $n_d$(at the d-line of $\lambda$=587.6 nm) of each lens element for the first embodiment.

TABLE 1

| Surface | R | $d_1$ | $d_2$ | $n_d$ | V | |
|---|---|---|---|---|---|---|
| 1 | 15.170 | 0.600 | 0.600 | 1.530 | 55.9 | Aspheric |
| 2 | 4.184 | 5.133 | 2.201 | | | Aspheric |
| 3 | 2.700 | 2.600 | 2.600 | 1.714 | 53.9 | Aperture |
| 4 | −4.896 | 0.400 | 0.400 | 1.806 | 25.5 | |
| 5 | −16.370 | 0.400 | 0.400 | | | |
| 6 | −5.145 | 0.600 | 0.600 | 1.586 | 30.1 | Aspheric |
| 7 | 4.029 | 0.431 | 3.363 | | | Aspheric |
| 8 | 39.380 | 1.672 | 1.672 | 1.517 | 64.2 | |
| 9 | −5.329 | 2.230 | 2.230 | | | |
| 10 | ∞ | 0.300 | 0.300 | 1.517 | 64.2 | |
| 11 | ∞ | 0.500 | 0.500 | | | |

Table 2 below lists the values of the constants K, $A_4$, $A_6$, $A_8$, $A_{10}$ and $A_{12}$ used in Equation (3) above for each of the aspheric lens surfaces of Table 1.

TABLE 2

| | Surface | | | |
|---|---|---|---|---|
| | 1 | 2 | 6 | 7 |
| K | 10 | −15.604 | 10 | −10 |
| $A_4$ | −0.650884E−2 | 0.189365E−1 | −0.410924E−1 | −0.267435E−2 |
| $A_6$ | 0.958770E−3 | −0.659529E−2 | −0.870482E−3 | −0.428714E−3 |
| $A_8$ | −0.657142E−4 | 0.185936E−2 | 0.106907E−1 | 0.397223E−2 |
| $A_{10}$ | −0.937298E−7 | −0.276315E−3 | −0.101026E−1 | −0.191713E−2 |
| $A_{12}$ | 0.184416E−6 | 0.166120E−4 | 0.290921E−2 | 0.313116E−3 |

In the first embodiment, the focal length of each lens group is following, which satisfy the relations (1) and (2).

$f_1$=−11.110

$f_2$=5.540

$f_3$=9.200

$f_3$=3.030 z=1.680

FIGS. 3A–3C and FIGS. 4A–4C show spherical aberration, astigmatism, and distortion, respectively, of the stepwise variable zoom lens system 100 in the first position and the second position, respectively, according to the first embodiment. PR in FIGS. 3A and 4A denotes the pupil radius of the stepwise variable zoom lens system 100. MF in FIGS. 3B–3C and 4B–4C denotes the maximum field of the stepwise variable zoom lens system 100. In FIGS. 3A–3C and FIGS. 4A–4C, d, F, and C denote d-line($\lambda$=587.6 nm), F-line($\lambda$=486.1 nm) and C-line($\lambda$=656.3 nm) respectively. Line S shows astigmatism in the sagittal image, and line T shows astigmatism in the tangential image.

Figure 5:
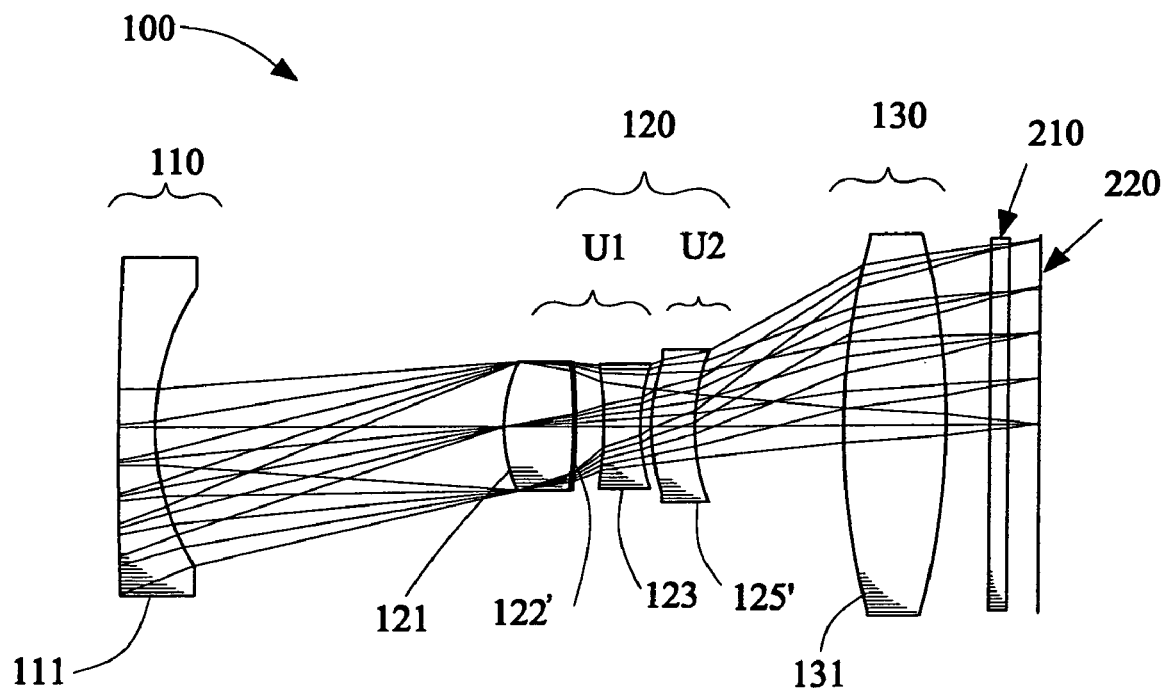
FIG. 5 is a cross-sectional view of the stepwise variable zoom lens system in the first position of a second embodiment according to the present invention.
Figure 6:
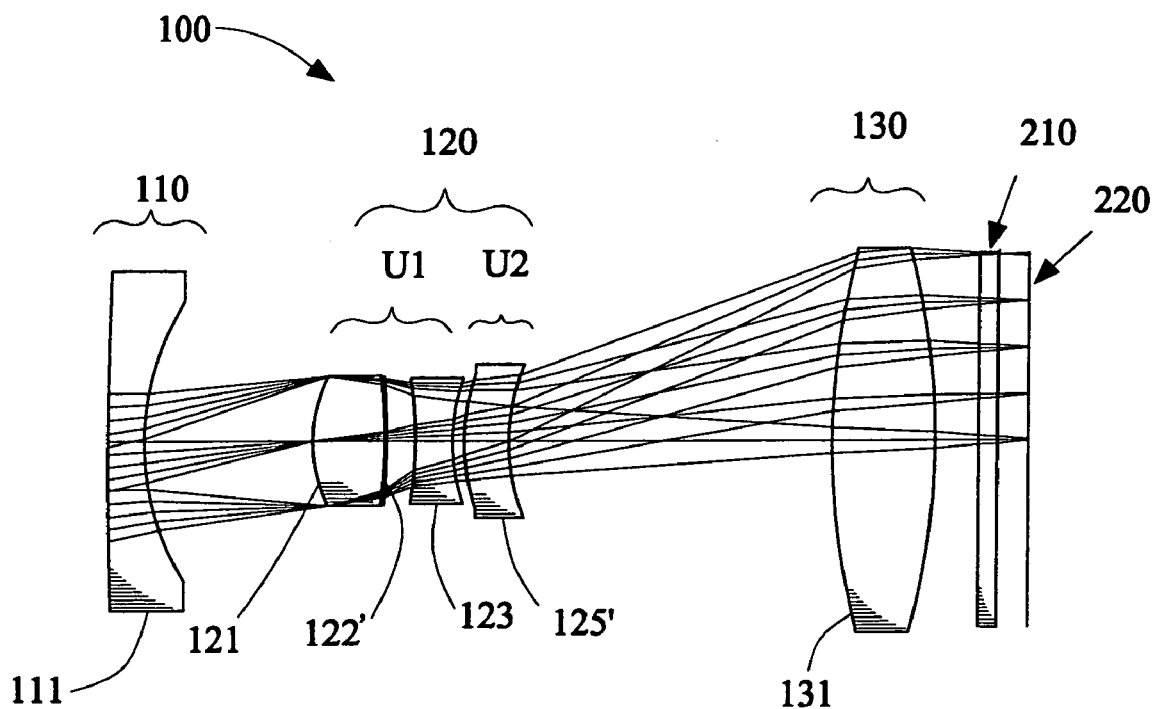
FIG. 6 is a cross-sectional view of the stepwise variable zoom lens system in the second position according to the second embodiment.
Figure 7C:
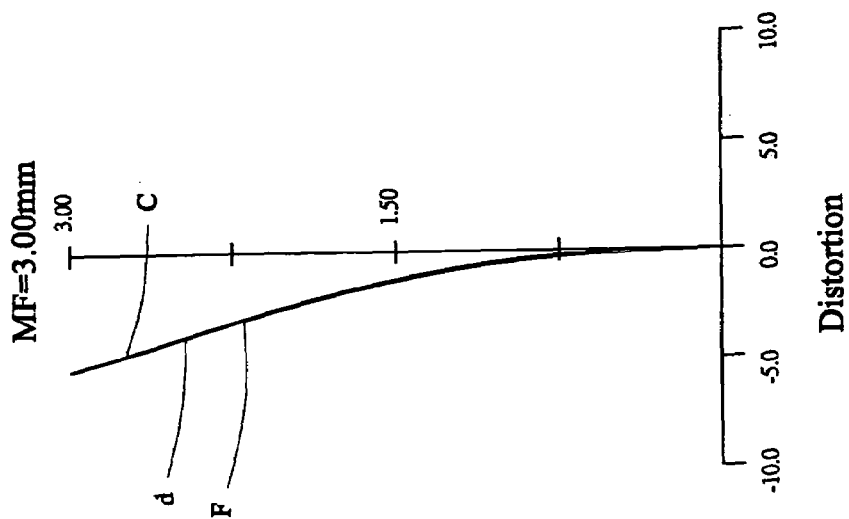
FIGS. 7A–7C show spherical aberration, astigmatism, and distortion, respectively, of the stepwise variable zoom lens system in the first position according to the second embodiment.
Figure 7B:
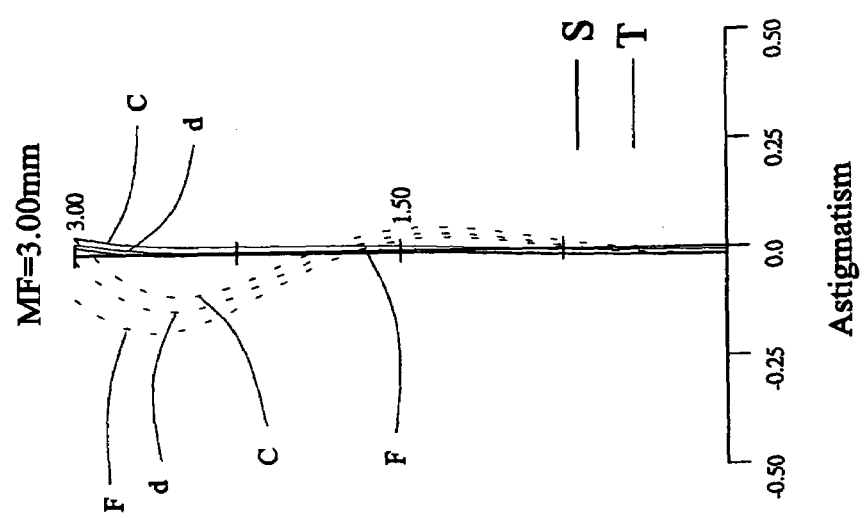
Figure 7A:
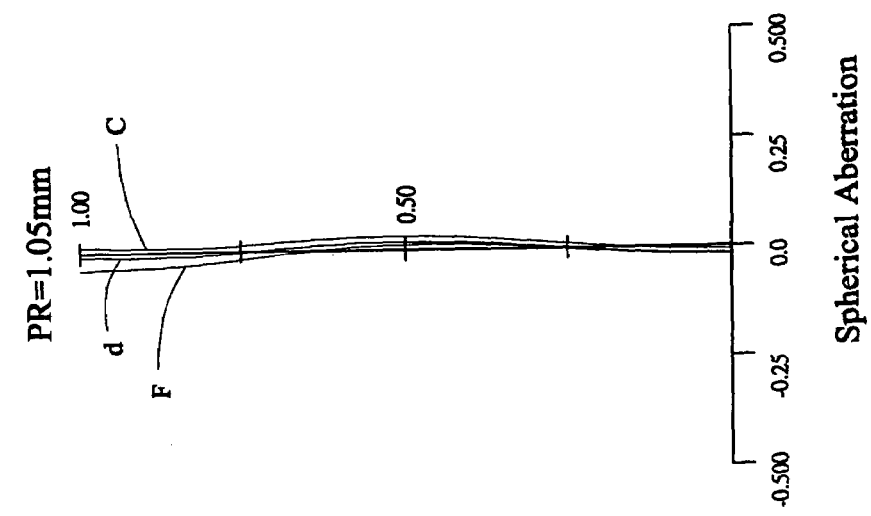

With reference to FIG. 5 and FIG. 6, a second embodiment is shown. The stepwise variable zoom lens system 100 in the present embodiment is similar to that shown in the first embodiment, the differences between which are that the first lens unit U1 of the second lens group 120 in the second embodiment is composed of a hybrid positive lens and a biconcave negative lens 123, and that the second lens unit U2 in the second embodiment is composed of a convex-concave negative lens 125'. The hybrid positive lens is formed by pressing a biconvex positive lens 121 and a resin negative lens 122' together. The plastic negative lens 122' has an aspheric surface facing to the image sensor 220 for eliminating the chromatic aberration and the advanced aberration.

Various values of the second embodiment are list in the table 3 and the table 4, wherein the same symbols stand for the same meanings as shown in the first embodiment.

TABLE 3

| Surface | R | $d_1$ | $d_2$ | $n_d$ | V | |
|---|---|---|---|---|---|---|
| 1 | 19.995 | 0.600 | 0.600 | 1.543 | 56.0 | Aspheric |
| 2 | 3.857 | 5.639 | 2.759 | | | Aspheric |
| 3 | 2.499 | 1.135 | 1.135 | 1.803 | 46.4 | Aperture |
| 4 | −9.978 | 0.040 | 0.040 | 1.520 | 51.4 | |
| 5 | −9.978 | 0.466 | 0.466 | | | Aspheric |
| 6 | −6.501 | 0.600 | 0.600 | 1.847 | 23.8 | |
| 7 | 3.008 | 0.193 | 0.193 | | | |
| 8 | 2.456 | 0.720 | 0.720 | 1.525 | 56.3 | Aspheric |
| 9 | 2.918 | 2.440 | 5.320 | | | Aspheric |
| 10 | 11.742 | 1.670 | 1.670 | 1.713 | 53.8 | |
| 11 | −11.742 | 0.698 | 0.698 | | | |
| 12 | ∞ | 0.300 | 0.300 | 1.517 | 64.2 | |
| 13 | ∞ | 0.500 | 0.500 | | | |

TABLE 4

| | Surface | | | | |
|---|---|---|---|---|---|
| | 1 | 2 | 5 | 8 | 9 |
| K | 9.998414 | −6.018141 | 4.549282 | 0.331269 | 3.530066 |
| $A_4$ | −0.430239E−2 | 0.844452E−2 | 0.120077E−1 | −0.313210E−1 | −0.620857E−2 |
| $A_6$ | 0.852077E−4 | −0.132563E−2 | −0.127473E−1 | −0.224909E−1 | −0.437533E−1 |
| $A_8$ | 0.206663E−4 | 0.841895E−4 | 0.135419E−1 | −0.504784E−2 | 0.203316E−1 |
| $A_{10}$ | −0.236851E−6 | 0.147235E−4 | −0.508264E−2 | 0.264617E−2 | −0.847188E−2 |
| $A_{12}$ | 0 | 0 | 0 | 0 | 0 |

In the second embodiment, the focal length of each lens group is following, which satisfy the relations (1) and (2).

$f_1 = -8.910$ $f_2 = 4.956$ $f_3 = 8.486$ $f_b = 1.498$ $z = 1.771$

FIGS. 7A–7C and FIGS. 8A–8C show spherical aberration, astigmatism, and distortion, respectively, of the stepwise variable zoom lens system 100 in the first position and the second position, respectively, according to the second embodiment. The same symbols in those figures stand for the same meanings as shown in the first embodiment.

Figure 9:
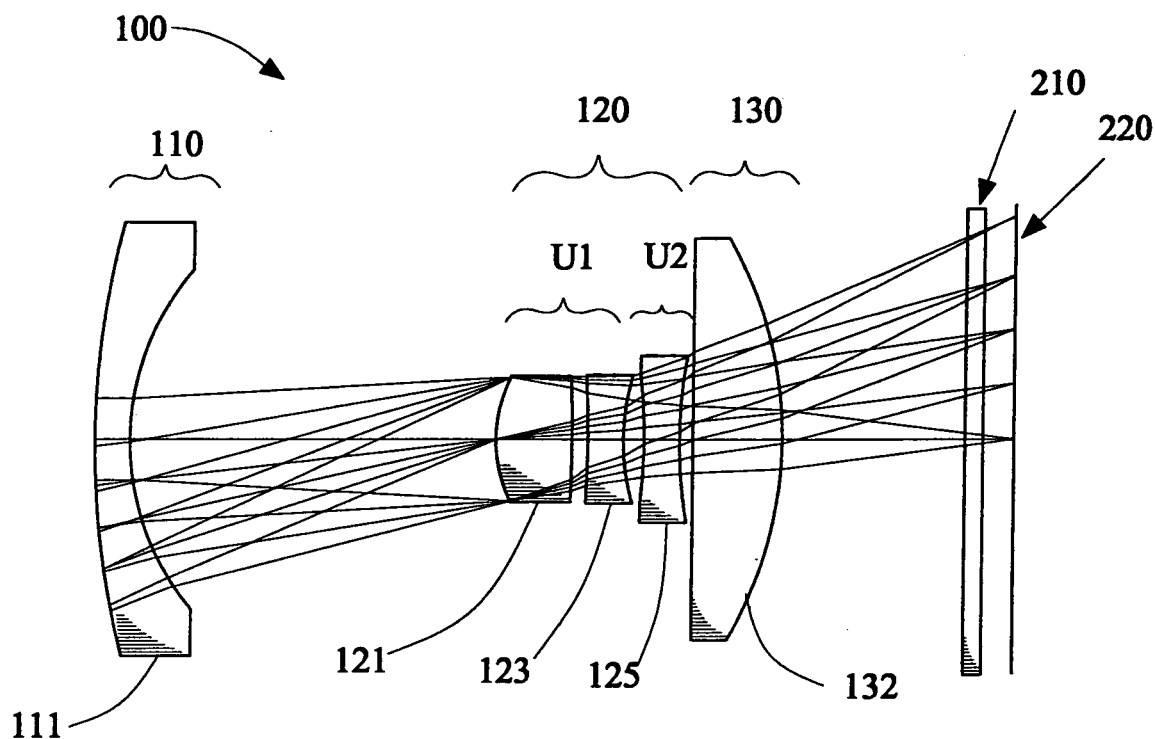
FIG. 9 is a cross-sectional view of the stepwise variable zoom lens system in the first position of a third embodiment according to the present invention.
Figure 10:
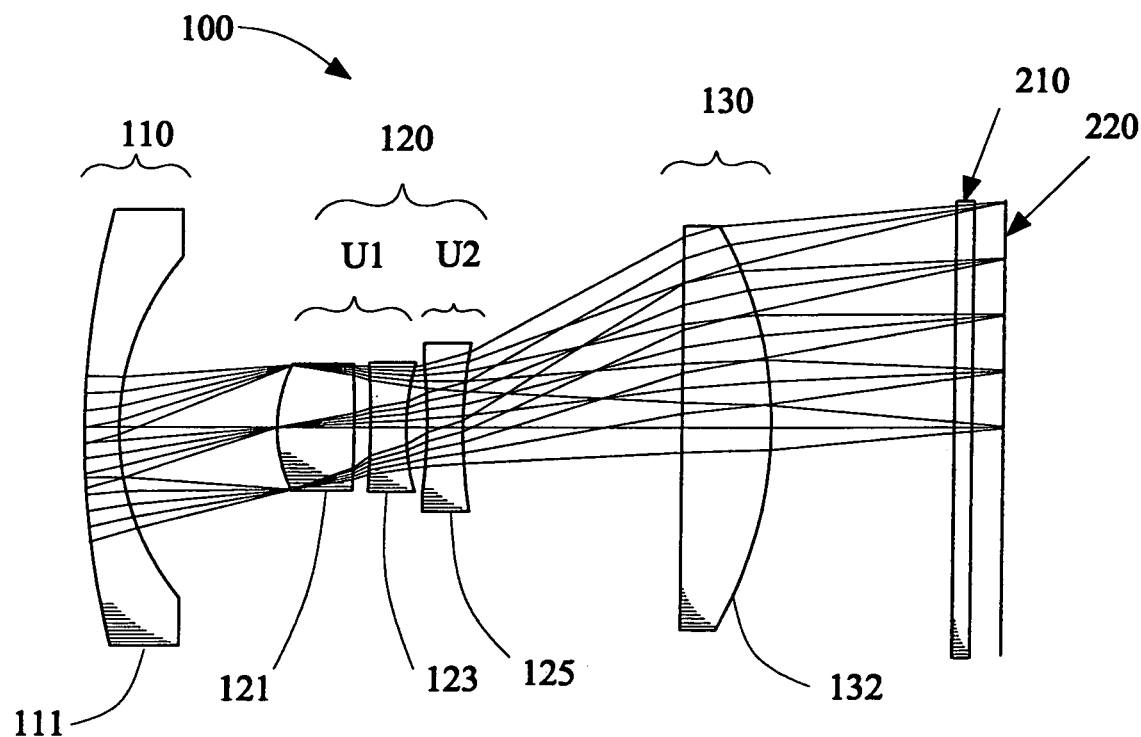
FIG. 10 is a cross-sectional view of the stepwise variable zoom lens system in the second position according to the third embodiment.
Figure 11A:
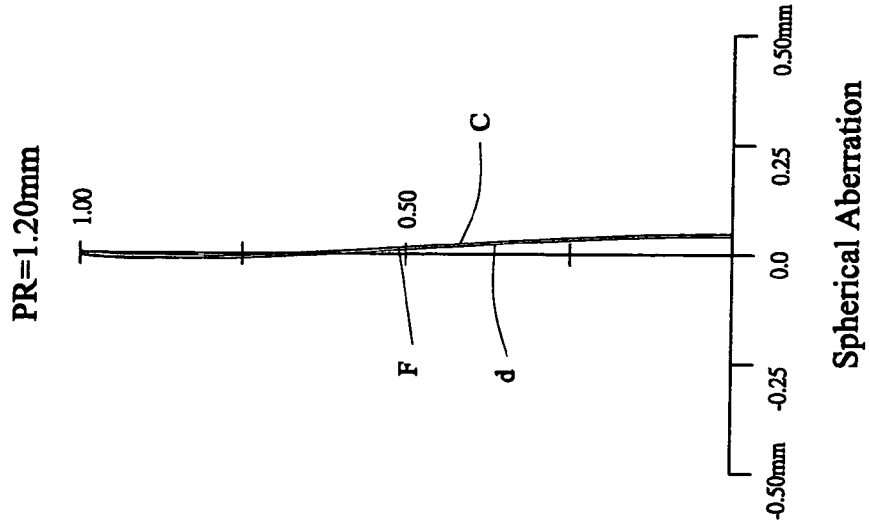
FIGS. 11A–11C show spherical aberration, astigmatism, and distortion, respectively, of the stepwise variable zoom lens system in the first position according to the third embodiment.
Figure 11B:
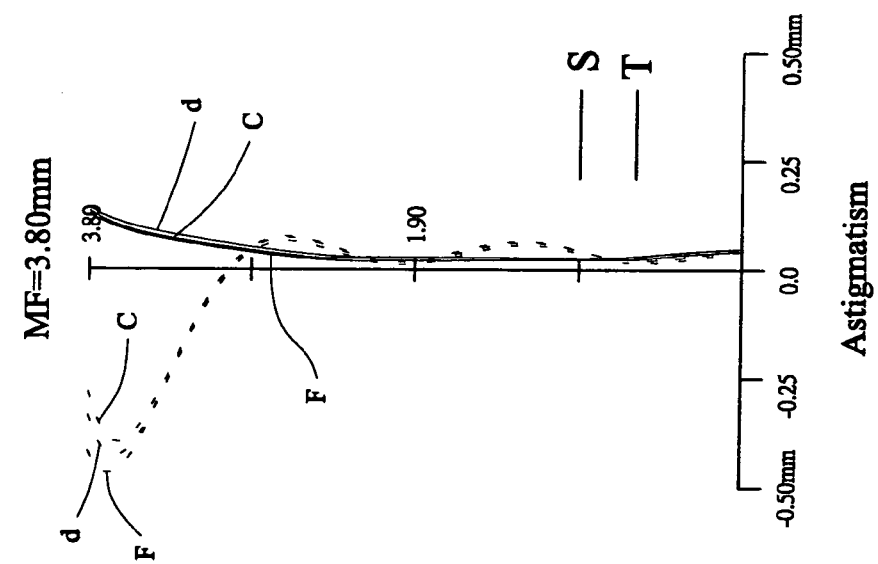
Figure 11C:
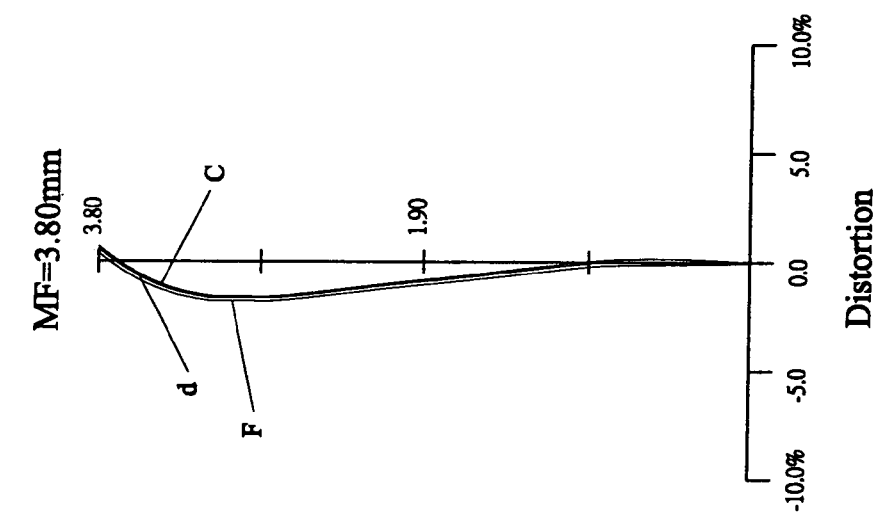

With reference to FIG. 9 and FIG. 10, a third embodiment is shown. The stepwise variable zoom lens system 100 in the present embodiment is similar to that shown in the first embodiment, the differences between which are that the first lens unit U1 of the second lens group 120 in the third embodiment is composed of a biconvex positive lens 121 and a biconcave negative lens 123, and that the third lens group 130 is composed of a plane-convex positive lens 132.

Various values of the third embodiment are list in the table 5 and the table 6, wherein the same symbols stand for the same meanings as shown in the first embodiment.

TABLE 5

| Surface | R | $d_1$ | $d_2$ | $n_d$ | V | |
|---|---|---|---|---|---|---|
| 1 | 15.146 | 0.600 | 0.600 | 1.530 | 55.9 | Aspheric |
| 2 | 4.577 | 6.155 | 2.675 | | | Aspheric |
| 3 | 2.360 | 1.303 | 1.303 | 1.714 | 53.9 | Aperture |
| 4 | −25.167 | 0.269 | 0.269 | | | |
| 5 | −18.123 | 0.600 | 0.600 | 1.806 | 25.5 | |
| 6 | 3.984 | 0.353 | 0.353 | | | |
| 7 | 7.472 | 0.600 | 0.600 | 1.586 | 30.1 | Aspheric |
| 8 | 3.999 | 0.226 | 3.706 | | | Aspheric |
| 9 | ∞ | 1.540 | 1.540 | 1.517 | 64.2 | |
| 10 | −6.650 | 3.195 | 3.195 | | | |
| 11 | ∞ | 0.300 | 0.300 | 1.517 | 64.2 | |
| 12 | ∞ | 0.500 | 0.500 | | | |

TABLE 6

| | Surface | | | |
|---|---|---|---|---|
| | 1 | 2 | 7 | 8 |
| K | 10 | −17.936620 | 10 | −10 |
| $A_4$ | −0.265236E-2 | 0.186584E-1 | −0.715584E-2 | −2.007840E-1 |
| $A_6$ | −0.414322E-4 | −0.548912E-2 | −0.207769E-1 | −9.169090E-2 |
| $A_8$ | 0.444892E-4 | 0.112657E-2 | 0.113479E-1 | 0.628447E-2 |
| $A_{10}$ | −0.357411E-5 | −0.119483E-3 | −0.124601E-1 | −0.151789E-2 |
| $A_{12}$ | 0.104452E-6 | 0.546056E-5 | 0.290921E-2 | 0.313116E-3 |

In the third invention, the focal length of each lens group is as follows, which satisfy the relations (1) and (2).

$f_1 = -12.620$ $f_2 = 6.600$ $f_3 = 9.330$ $f_b = 3.995$ $z = 1.680$

FIGS. 11A–11C and FIGS. 12A–12C show spherical aberration, astigmatism, and distortion, respectively, of the stepwise variable zoom lens system 100 in the first position and the second position respectively, according to the third embodiment. The same symbols in those figures stand for the same meanings as shown in the first embodiment.

Figure 13:
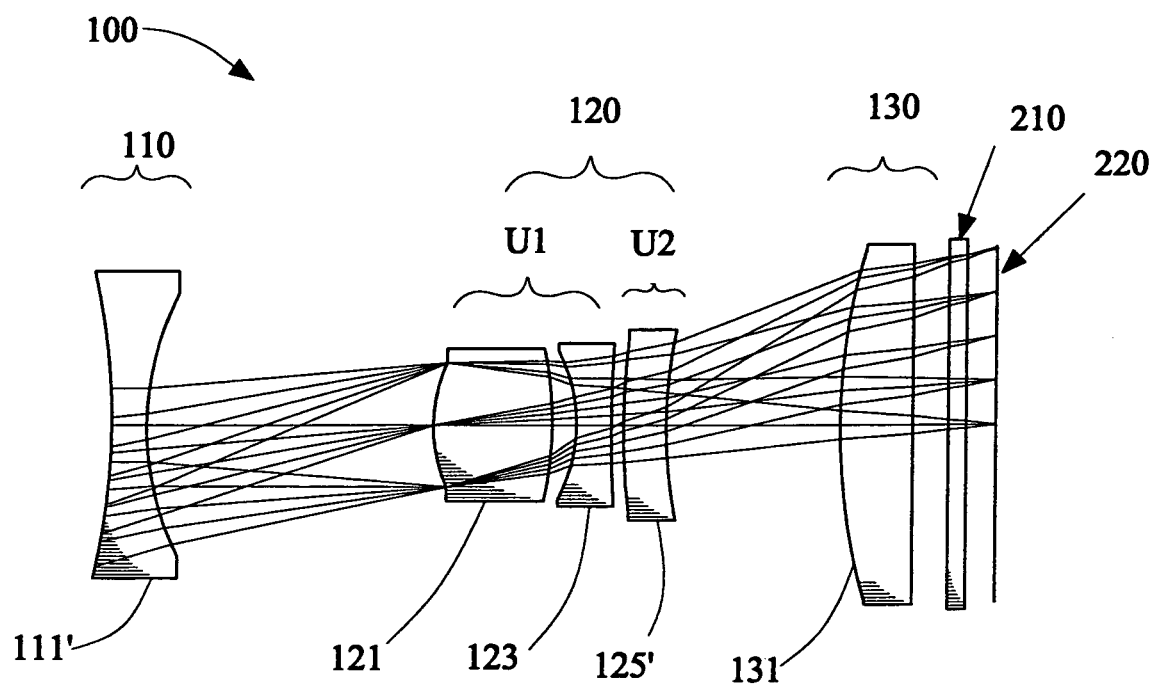
FIG. 13 is a cross-sectional view of the stepwise variable zoom lens system in the first position of a fourth embodiment according to the present invention.
Figure 14:
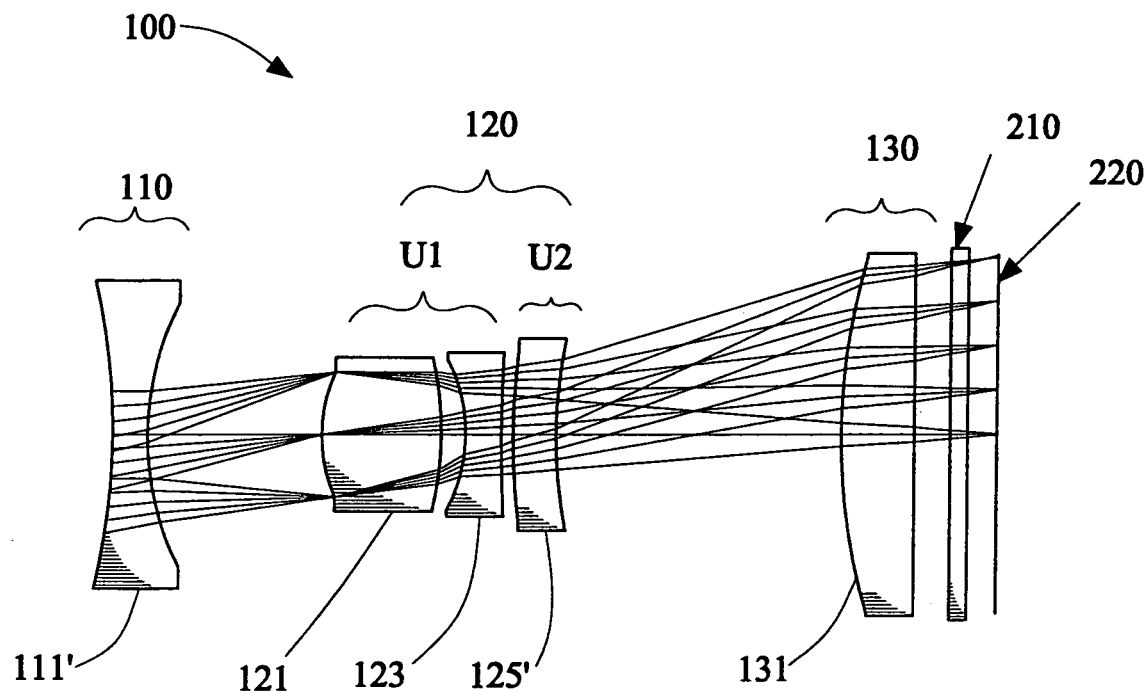
FIG. 14 is a cross-sectional view of the stepwise variable zoom lens system in the second position according to the fourth embodiment.
Figure 15C:
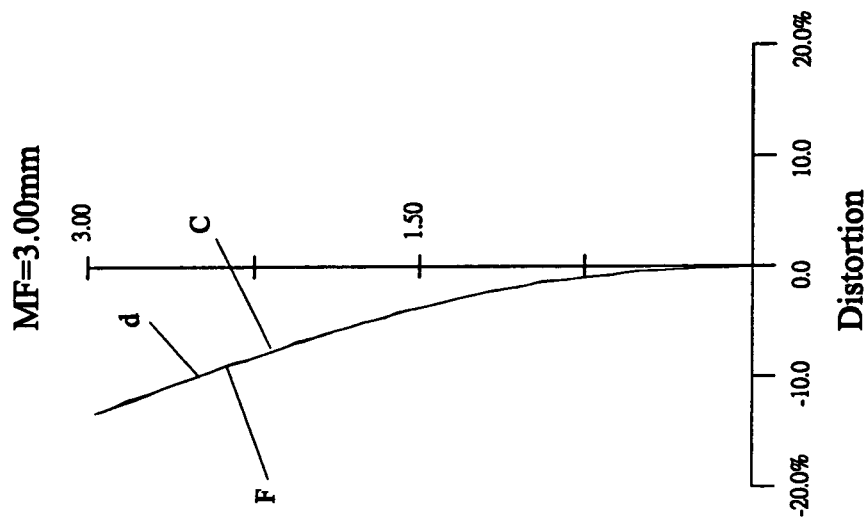
FIGS. 15A–15C show spherical aberration, astigmatism, and distortion, respectively, of the stepwise variable zoom lens system in the first position according to the fourth embodiment.
Figure 15B:
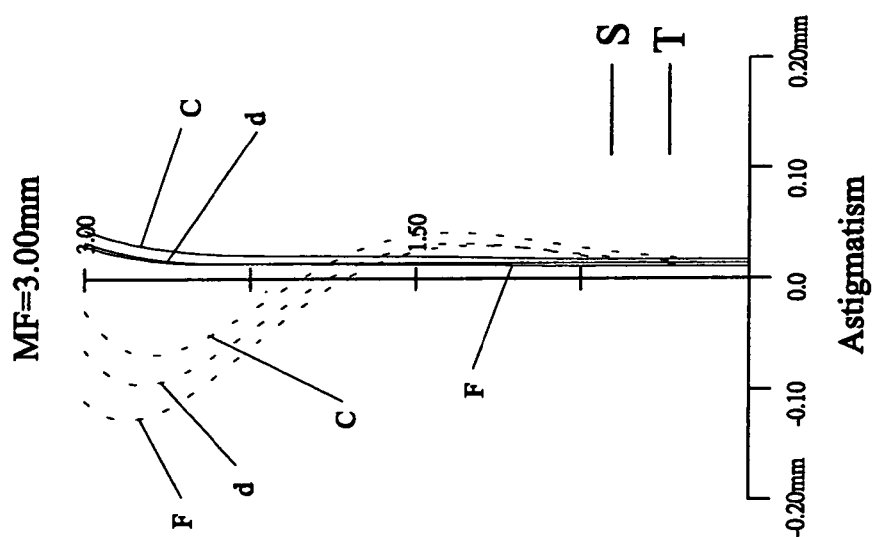
Figure 15A:
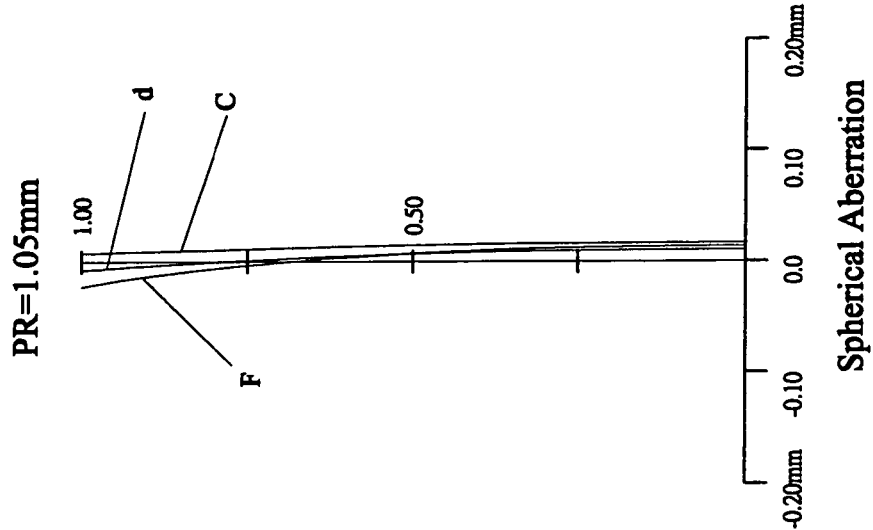
Figure 16A:
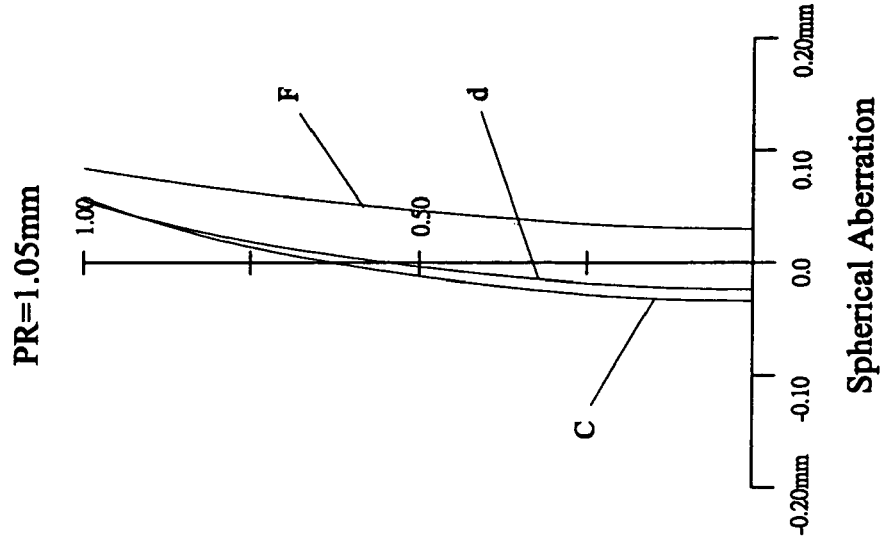
FIGS. 16A–16C show spherical aberration, astigmatism, and distortion, respectively, of the stepwise variable zoom lens system in the second position according to the fourth embodiment.
Figure 16B:
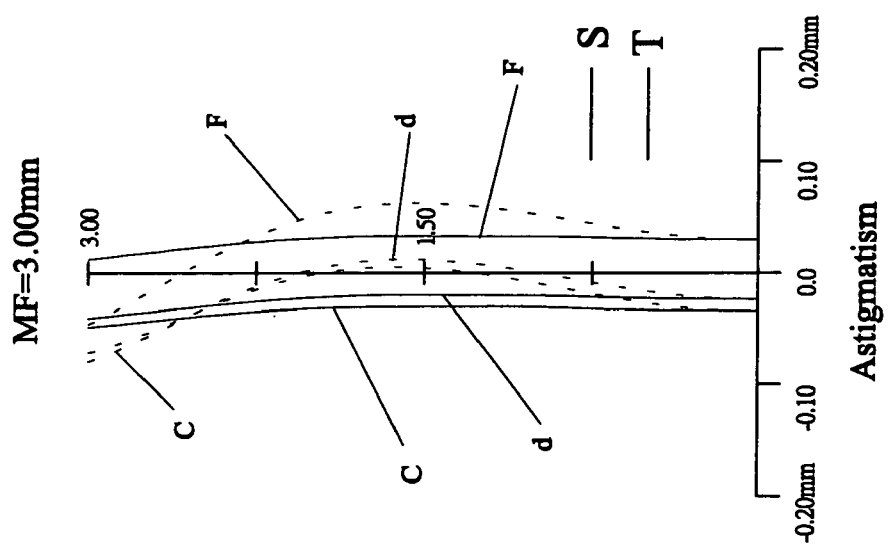
Figure 16C:
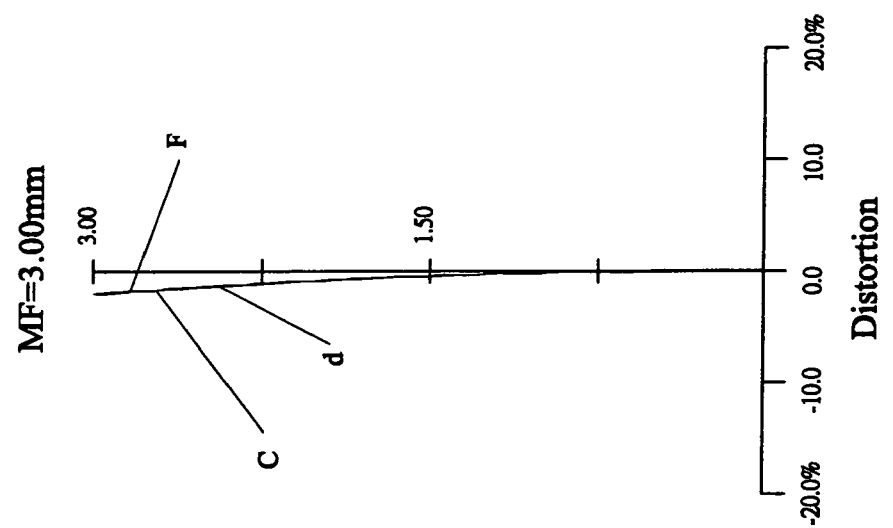

With reference to FIG. 13 and FIG. 14, a fourth embodiment is shown. The stepwise variable zoom lens system 100 in the present embodiment is similar to that shown in the second embodiment, the differences between which are that the first lens group in the fourth embodiment is composed of a biconcave negative lens 111', and that the first lens unit U1 of the second lens group 120 is composed of a biconvex positive lens 121 and a biconcave negative lens 123.

Various values of the fourth embodiment are list in the table 7 and the table 8, wherein the same symbols stand for the same meanings as shown in the first embodiment.

TABLE 7

| Surface | R | $d_1$ | $d_2$ | $n_d$ | V | |
|---|---|---|---|---|---|---|
| 1 | −7.549 | 0.600 | 0.600 | 1.491 | 57.4 | Aspheric |
| 2 | 3.680 | 4.851 | 2.962 | | | Aspheric |
| 3 | 2.588 | 2.014 | 2.014 | 1.713 | 53.8 | Aperture |
| 4 | −5.913 | 0.412 | 0.412 | | | |
| 5 | −2.721 | 0.600 | 0.600 | 1.805 | 25.4 | |
| 6 | 23.966 | 0.199 | 0.199 | | | |
| 7 | 3.904 | 0.720 | 0.720 | 1.521 | 48.1 | Aspheric |
| 8 | 5.156 | 2.981 | 4.870 | | | Aspheric |
| 9 | 10.529 | 1.243 | 1.243 | 1.602 | 63.5 | |
| 10 | −625.866 | 0.600 | 0.600 | | | |
| 11 | ∞ | 0.300 | 0.300 | 1.517 | 64.2 | |
| 12 | ∞ | 0.500 | 0.500 | | | |

TABLE 8

| | Surface | | | |
|---|---|---|---|---|
| | 1 | 2 | 7 | 8 |
| K | −5.6510 | −6.7294 | 0 | 3.3876 |
| $A_4$ | −1.776137E-2 | −3.499917E-3 | −2.159358E-2 | −3.432277E-5 |
| $A_6$ | 2.587407E-3 | 1.190527E-4 | −9.661138E-3 | −1.3457811E-2 |
| $A_8$ | −1.600197E-4 | 3.367767E-4 | −3.600200E-3 | 2.400977E-3 |
| $A_{10}$ | 2.851552E-6 | −2.860850E-5 | 1.654988E-3 | 2.623520E-5 |
| $A_{12}$ | 0 | 0 | 0 | 0 |

In the fourth invention, the focal length of each lens group is as follows, which satisfy the relations (1) and (2).

$f_1 = -4.943$ $f_2 = 4.756$ $f_3 = 16.978$ $f_b = 1.400$ $z = 1.730$

FIGS. 15A–15C and FIGS. 16A–16C show spherical aberration, astigmatism, and distortion, respectively, of the stepwise variable zoom lens system 100 in the first position and the second position respectively, according to the fourth embodiment. The same symbols in those figures stand for the same meanings as shown in the first embodiment.

Figure 17:
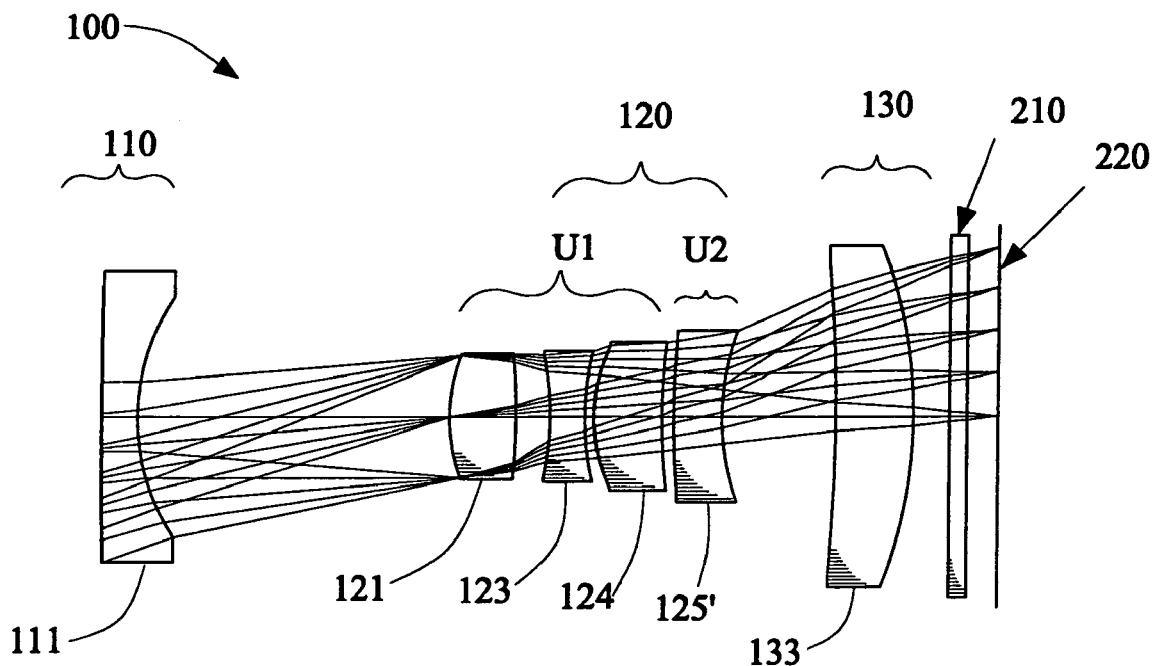
FIG. 17 is a cross-sectional view of the stepwise variable zoom lens system in the first position of a fifth embodiment according to the present invention.
Figure 18:
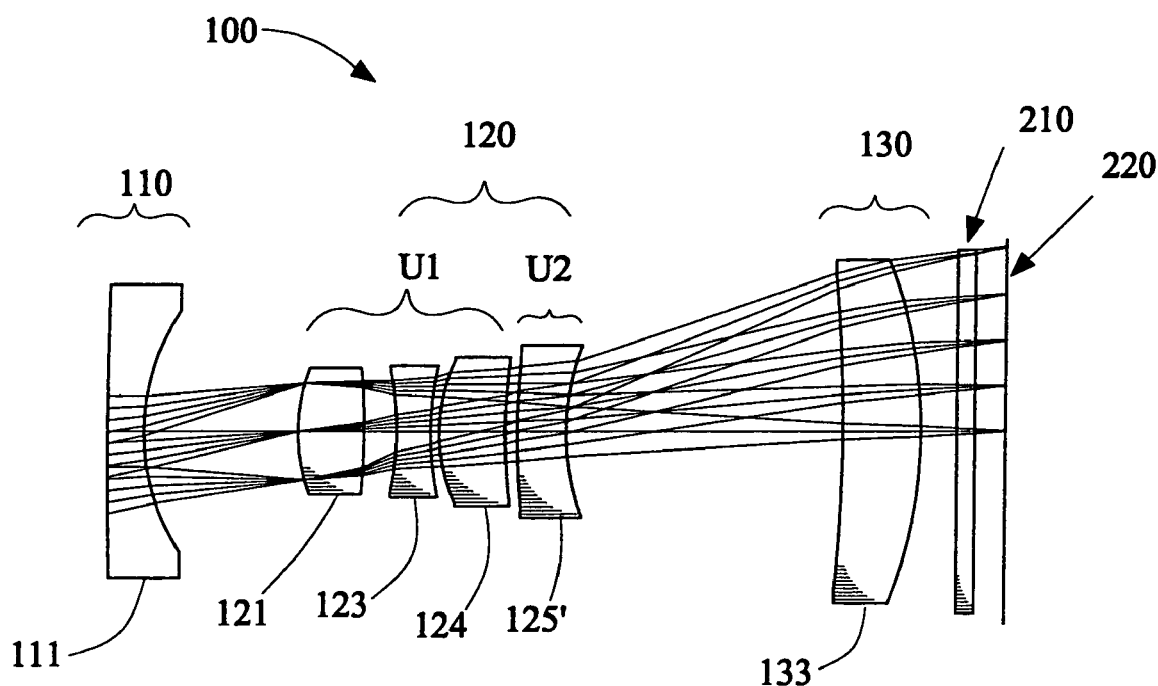
FIG. 18 is a cross-sectional view of the stepwise variable zoom lens system in the second position according to the fifth embodiment.
Figures 19A, 19B, 19C:
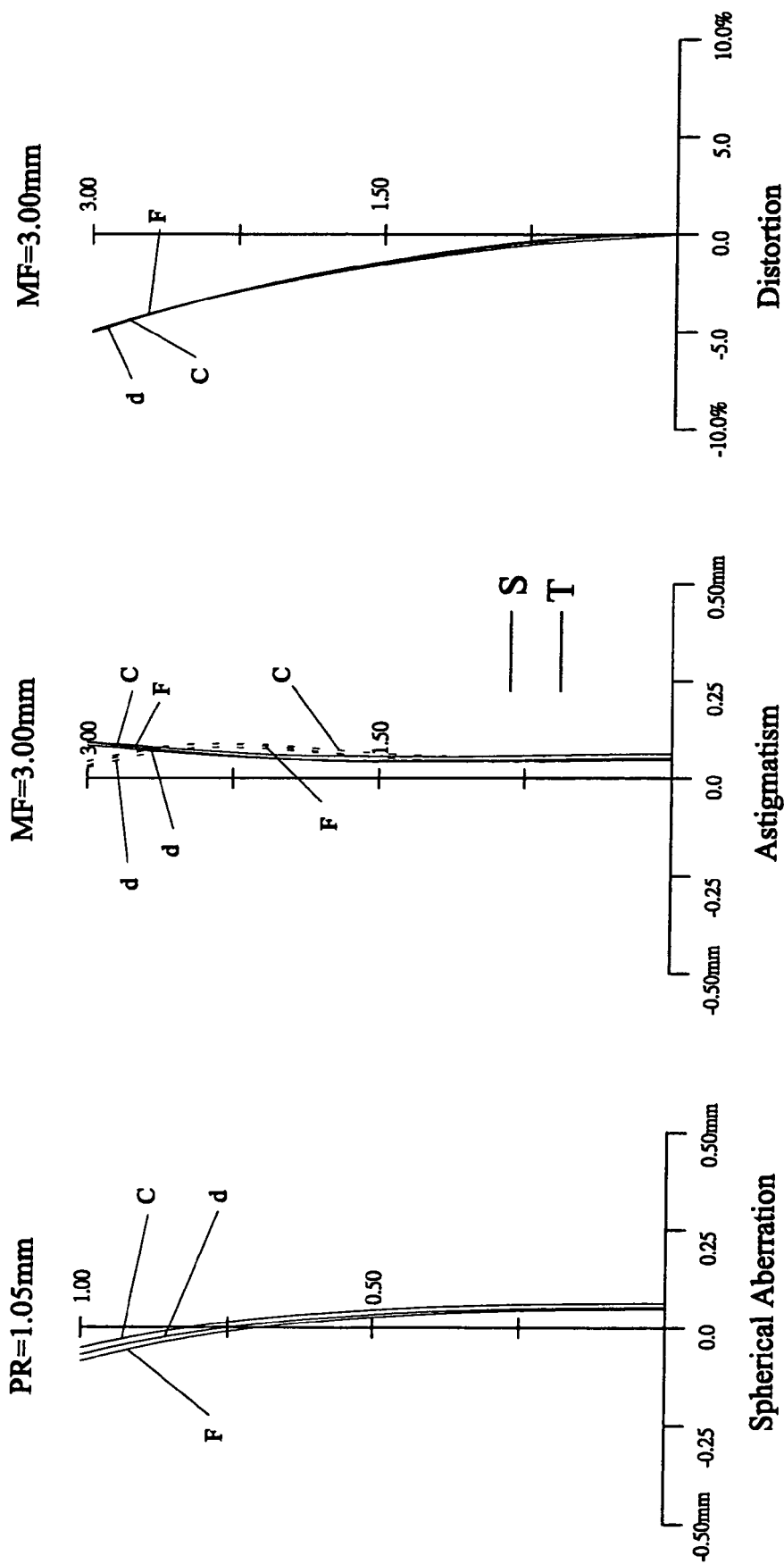
FIGS. 19A–19C show spherical aberration, astigmatism, and distortion, respectively, of the stepwise variable zoom lens system in the first position according to the fifth embodiment.

With reference to FIG. 17 and FIG. 18, a fifth embodiment is shown. The stepwise variable zoom lens system 100 in the present embodiment is similar to that shown in the second embodiment, the differences between which are that the first lens unit U1 of the second lens group 120 in the fifth embodiment is composed of a biconvex positive lens 121, a biconcave negative lens 123 and a convex-concave positive lens 124, and that the third lens group 130 is composed of a concave-convex positive lens 133.

Various values of the fifth embodiment are list in the table 9 and the table 10, wherein the same symbols stand for the same meanings as shown in the first embodiment.

TABLE 9

| Surface | R | $d_1$ | $d_2$ | $n_d$ | V | |
|---|---|---|---|---|---|---|
| 1 | 52.114 | 0.600 | 0.600 | 1.543 | 56.0 | Aspheric |
| 2 | 3.708 | 5.240 | 2.568 | | | Aspheric |
| 3 | 2.925 | 1.117 | 1.117 | 1.804 | 46.5 | Aperture |
| 4 | −11.208 | 0.558 | 0.558 | | | |
| 5 | −4.977 | 0.572 | 0.572 | 1.805 | 25.5 | |
| 6 | 4.840 | 0.145 | 0.145 | | | |
| 7 | 2.850 | 1.115 | 1.115 | 1.517 | 64.2 | |
| 8 | 10.275 | 0.200 | 0.200 | | | |
| 9 | 3.938 | 0.798 | 0.798 | 1.520 | 51.4 | Aspheric |
| 10 | 2.864 | 1.927 | 4.599 | | | Aspheric |
| 11 | −26.937 | 1.330 | 1.330 | 1.713 | 53.8 | |
| 12 | −7.622 | 0.597 | 0.597 | | | |
| 13 | ∞ | 0.300 | 0.300 | 1.517 | 64.2 | |
| 14 | ∞ | 0.500 | 0.500 | | | |

TABLE 10

| | Surface | | | |
|---|---|---|---|---|
| | 1 | 2 | 9 | 10 |
| K | 1.541916 | 0.062104 | −5.002061 | −4.167022 |
| $A_4$ | −0.217713E−3 | 0.117334E−2 | −0.343674E−1 | −0.350275E−2 |
| $A_6$ | −0.146712E−3 | −0.175252E−3 | −0.812569E−2 | −0.589330E−2 |
| $A_8$ | 0.692152E−5 | −0.645287E−4 | −0.139806E−2 | −0.121543E−3 |
| $A_{10}$ | 0.436252E−6 | 0.136159E−4 | −0.151730E−3 | 0.407579E−3 |
| $A_{12}$ | 0 | 0 | 0 | 0 |

In the fifth embodiment, the focal length of each lens group is as follows, which satisfy the relations (1) and (2).

$f_1 = -7.380$ $f_2 = 4.440$ $f_3 = 14.490$ $f_b = 1.397$ $z = 1.791$

FIGS. 19A–19C and FIGS. 20A–20C show spherical aberration, astigmatism, and distortion, respectively, of the stepwise variable zoom lens system 100 in the first position and the second position respectively, according to the fifth embodiment. The same symbols in those figures stand for the same meanings as shown in the first embodiment.

As will be apparent to those skilled in the art according to the foregoing disclosure, many alterations and modifications, such as the lenses of the first lens group 110 and the second lens unit U2 of the second lens group are substituted with a cemented negative lens or a hybrid negative lens, and the lens of the third lens group is substituted with a cemented negative lens or a hybrid positive lens, are possible in the practice of the present invention without departing from the spirit or scope thereof.

What is claimed is:

1. A stepwise variable zoom lens system adapted to create an image of a scene on an image sensor, in order from an object side, comprising:
    a first lens group of negative refracting power, the first lens group being constructed from a single block;
    a second lens group of positive refracting power, the second lens group including a first lens unit having a positive refracting power and a second lens unit having a negative refracting power, the second lens unit being constructed from a single block; and
    a third lens group of positive refracting power, the third lens groups being constructed from a single block;
    wherein said first and third lens groups are fixed relatively to the image sensor, said second lens group is movable so as to be selectively disposed in several discrete positions, and focal lengths of said lens groups satisfy the following relations:

$$f_2 \cdot \left(1 + \sqrt{z}\right) > -f_1$$

$$f_2 \cdot \left(1 + \frac{1}{\sqrt{z}}\right) > \frac{f_3 \cdot f_b}{f_3 - f_b}$$

wherein $f_1$ denotes the focal length of the first lens group, $f_2$ denotes the focal length of the second lens group, $f_3$ denotes the focal length of the third lens group, $f_b$ denotes the back focal length of the stepwise variable zoom lens system, and z denotes the zoom ratio.

2. The stepwise variable zoom lens system as claimed in claim 1, wherein the first lens group, the second lens unit of the second lens group and the third lens group are composed of a single lens element.

3. The stepwise variable zoom lens system as claimed in claim 2, wherein both refractive surfaces of the lens elements of said first lens group and said second lens unit of the second lens group are aspheric.

4. The stepwise variable zoom lens system as claimed in claim 3, wherein the first lens group is composed of a convex-concave negative lens; the first lens unit of the second lens group is composed of a cemented positive lens which is formed by cementing a biconvex positive lens and a concave-convex negative lens, the second lens unit is composed of a biconcave negative lens; and the third lens group is composed of a biconvex positive lens.

5. The stepwise variable zoom lens system as claimed in claim 3, wherein the first lens group is composed of a convex-concave negative lens; the first lens unit of the second lens group is composed of a hybrid positive lens and a biconcave negative lens, the hybrid positive lens is formed by cementing a biconvex positive lens and a plastic negative lens, the second lens unit is composed of a convex-concave negative lens; and
    the third lens group is composed of a biconvex positive lens.

6. The stepwise variable zoom lens system as claimed in claim 5, wherein the refractive surface facing to the image sensor of said plastic lens of the second lens unit of the second lens group is aspheric.

7. The stepwise variable zoom lens system as claimed in claim 3, wherein the first lens group is composed of a convex-concave negative lens; the first lens unit of the second lens group is composed of a biconvex positive lens and a biconcave negative lens, the second lens unit is composed of a biconcave negative lens; and the third lens group is composed of a plane-convex positive lens.

8. The stepwise variable zoom lens system as claimed in claim 3, wherein the first lens group is composed of a biconcave negative lens; the first lens unit of the second lens group is composed of a biconvex positive lens and a biconcave negative lens, the second lens unit is composed of a convex-concave negative lens; and the third lens group is composed of a biconvex positive lens.

9. The stepwise variable zoom lens system as claimed in claim 3, wherein the first lens group is composed of a convex-concave negative lens; the first lens unit of the second lens group is composed of a biconvex positive lens, and a biconcave negative lens and a convex-concave positive lens, the second lens unit is composed of a convex-concave negative lens; and the third lens group is composed of a concave-convex positive lens.

* * * * *